United States Patent
Jung et al.

(10) Patent No.: US 10,216,882 B2
(45) Date of Patent: Feb. 26, 2019

(54) CRITICAL PATH STRAIGHTENING SYSTEM BASED ON FREE-SPACE AWARE AND TIMING DRIVEN INCREMENTAL PLACEMENT

(71) Applicant: International Business Machines Corporation, Armonk, NY (US)

(72) Inventors: Jinwook Jung, Daejeon (KR); Frank Musante, Poughkeepsie, NY (US); Gi-Joon Nam, Chappaqua, NY (US); Shyam Ramji, Lagrangeville, NY (US); Lakshmi Reddy, Briarcliff Manor, NY (US); Gustavo Tellez, Hyde Park, NY (US); Cindy S. Washburn, Poughquag, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/341,814

(22) Filed: Nov. 2, 2016

(65) Prior Publication Data
US 2018/0121575 A1    May 3, 2018

(51) Int. Cl.
*G06F 17/00* (2006.01)
*G06F 17/50* (2006.01)

(52) U.S. Cl.
CPC ........ *G06F 17/505* (2013.01); *G06F 17/5072* (2013.01); *G06F 2217/06* (2013.01)

(58) Field of Classification Search
USPC ...................................................... 716/104
See application file for complete search history.

(56) References Cited

U.S. PATENT DOCUMENTS

| | | |
|---|---|---|
| 5,396,435 A | 3/1995 | Ginetti |
| 5,751,596 A | 5/1998 | Ginetti et al. |
| 7,707,530 B2 | 4/2010 | Alpert et al. |
| (Continued) | | |

OTHER PUBLICATIONS

Chang, et al., "Timing ECO optimization via Bezier curve smoothing and fixability identification," IEEE Transactions on Computer-Aided Design of Integrated Circuits and Systems, vol. 31, No. 12, 2012, pp. 1857-1866.

(Continued)

*Primary Examiner* — Mohammed Alam
(74) *Attorney, Agent, or Firm* — Cantor Colburn LLP; Steven Meyers

(57) ABSTRACT

A physical synthesis system includes a path straightening module, an ideal critical point identification (ID) module, and a free-space ID module. The path straightening module identifies at least one meandering critical path of a circuit, and generates a reference curve based on dimensions of the critical path. The ideal critical point ID module identifies at least one critical point on the reference curve. The free-space ID module identifies at least one free-space to receive a gate with respect to at least one critical point. The physical synthesis system further includes a free-space selector module and a gate modification module. The free-space selector module determines a modified slack timing value based on relocating the gate to the at least one free-space. The gate modification module moves the gate to the at least one free-space when the modified slack timing value is greater than an initial slack timing value.

17 Claims, 11 Drawing Sheets

(56) References Cited

U.S. PATENT DOCUMENTS

| | | |
|---|---|---|
| 8,543,966 B2 | 9/2013 | Bickford et al. |
| 8,667,441 B2 | 3/2014 | Alpert et al. |
| 8,776,000 B2 | 7/2014 | Chang et al. |
| 8,966,422 B1 | 2/2015 | Reddy et al. |
| 9,075,948 B2 | 7/2015 | Kazda et al. |
| 2005/0138590 A1 | 6/2005 | Amundson et al. |
| 2008/0216038 A1* | 9/2008 | Bose ............... G06F 17/5072 716/118 |
| 2008/0216040 A1* | 9/2008 | Furnish ........... G06F 17/5068 716/122 |
| 2012/0137263 A1* | 5/2012 | Dai ................. G06F 17/5031 716/113 |
| 2015/0234971 A1* | 8/2015 | Nam ............... G06F 17/5072 716/122 |

OTHER PUBLICATIONS

Bock, et al., "Local search algorithms for timing-driven placement under arbitrary delay modles," 52nd ACM/EDAC/IEEE Design Automation Conference, DAC, 2015, 6 pages.

Moffitt, et al., "Path smoothing via discrete optimization," 45th ACM/IEEE Design Automation Conference, DAC, 2008, pp. 724-727.

Viswanathan, et al., "ITOP: integrating timing optimization within placement," 19th International Symposium on Physical Design, 2010, pp. 83-90.

\* cited by examiner

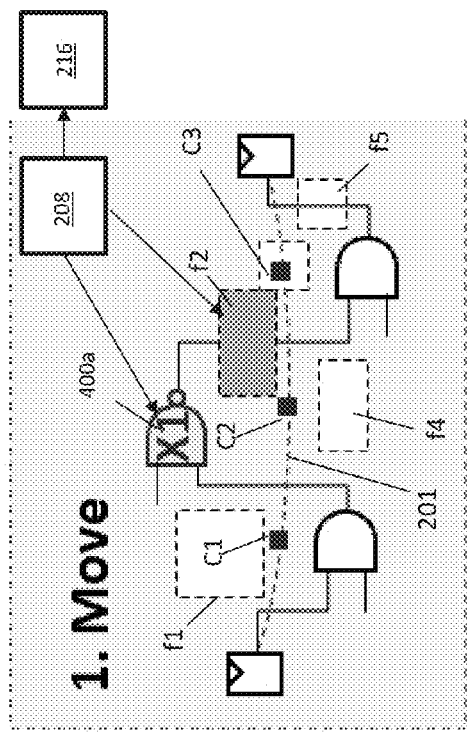
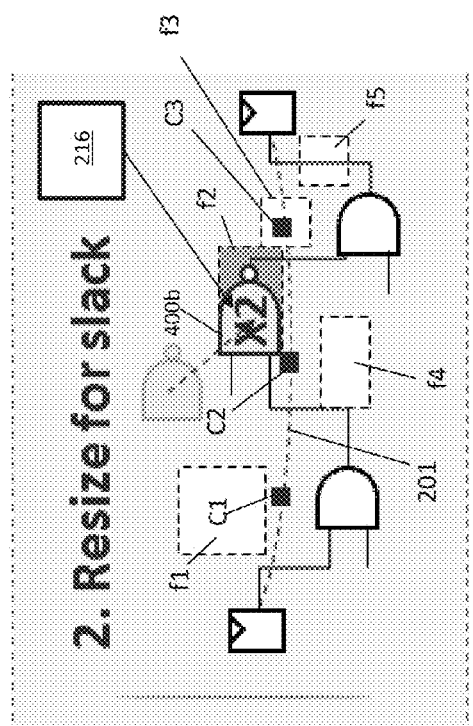
FIG. 10A
FIG. 10B

CRITICAL PATH STRAIGHTENING SYSTEM BASED ON FREE-SPACE AWARE AND TIMING DRIVEN INCREMENTAL PLACEMENT

BACKGROUND

The present invention relates generally to integrated circuit (chip) design, and more specifically, to synthesis of a logical chip design to a physical design.

Timing closure in VLSI design is an optimization process to meet the target timing performance while satisfying geometric constraints of a design. In modern design flows, this concept is extended to design closure by including power, thermal and manufacturability constraints that become more important as technology pursues decreased component sizing. Nonetheless, timing constrains contribute significantly to the quality of a design. Timing closure itself includes several optimizations such as placement, routing, sizing transistors or gates, buffer insertion and sometimes logic restructuring. For instance, critical paths between latches and/or gates affect the overall timing closure. These critical paths can deviate or meander from the desired design path thereby increasing path delays and overall timing closure.

SUMMARY

According to a non-limiting embodiment, a physical synthesis system comprises a path straightening module, an ideal critical point identification (ID) module, and a free-space ID module. The path straightening module includes a computer hardware processor that identifies at least one meandering critical path of a circuit, and generates a reference curve based on dimensions of the critical path. The critical path includes at least one gate coupled thereto that defines an initial slack timing value. The ideal critical point ID module includes a hardware computer processor that identifies at least one critical point on the reference curve. The free-space ID module includes a hardware computer processor that identifies at least one free-space to receive the gate with respect to the at least one critical point. The physical synthesis system further includes a free-space selector module and a gate modification module. The free-space selector module includes a hardware computer processor that determines a modified slack timing value based on relocating the at least one gate to the at least one free-space. The gate modification module includes a hardware computer processor that moves the at least one gate to the at least one free-space when the modified slack timing value is greater than the initial slack timing value.

According to another non-limiting embodiment, a method of straightening a critical path comprises identifying, via a path straightening module including a computer hardware processor, at least one meandering critical path of a circuit, and generating via the path straightening module a reference curve based on dimensions of the critical path. The critical path includes at least one gate coupled thereto that defines an initial slack timing value. The method further includes identifying, via a critical point identification (ID) module including a hardware computer processor, at least one critical point on the reference curve. The method further includes identifying, via a free-space ID module including a hardware computer processor, at least one free-space to receive the gate with respect to the at least one critical point. The method further includes determining, via a free-space selector module including a hardware computer processor, a modified slack timing value based on relocating the at least one gate to the at least one free-space. The method further includes moving, via a gate modification module including a hardware computer processor, the at least one gate to the at least one free-space when the modified slack timing value is greater than the initial slack timing value.

According to yet another non-limiting embodiment, a computer program product for straightening a critical path of an electronic circuit comprises a computer readable storage medium having program instructions embodied therewith. The program instructions are executable by an electronic computer processor to perform operations including identifying at least one meandering critical path of a circuit, and generating a reference curve based on dimensions of the critical path. The critical path includes at least one gate coupled thereto that defines an initial slack timing value. The operations further include identifying at least one critical point on the reference curve. The operations further include identifying at least one free-space to receive the gate with respect to the at least one critical point. The operations further include determining a modified slack timing value based on relocating the at least one gate to the at least one free-space. The operations further include moving the at least one gate to the at least one free-space when the modified slack timing value is greater than the initial slack timing value.

Additional features are realized through the techniques of the present invention. Other embodiments are described in detail herein and are considered a part of the claimed invention. For a better understanding of the invention with the features, refer to the description and to the drawings.

BRIEF DESCRIPTION OF THE DRAWINGS

FIGS. 10A and 10B illustrate a gate sizing procedure following relocation of a gate to further improve timing closure according to a non-limiting embodiment.

DETAILED DESCRIPTION

Figure 1:
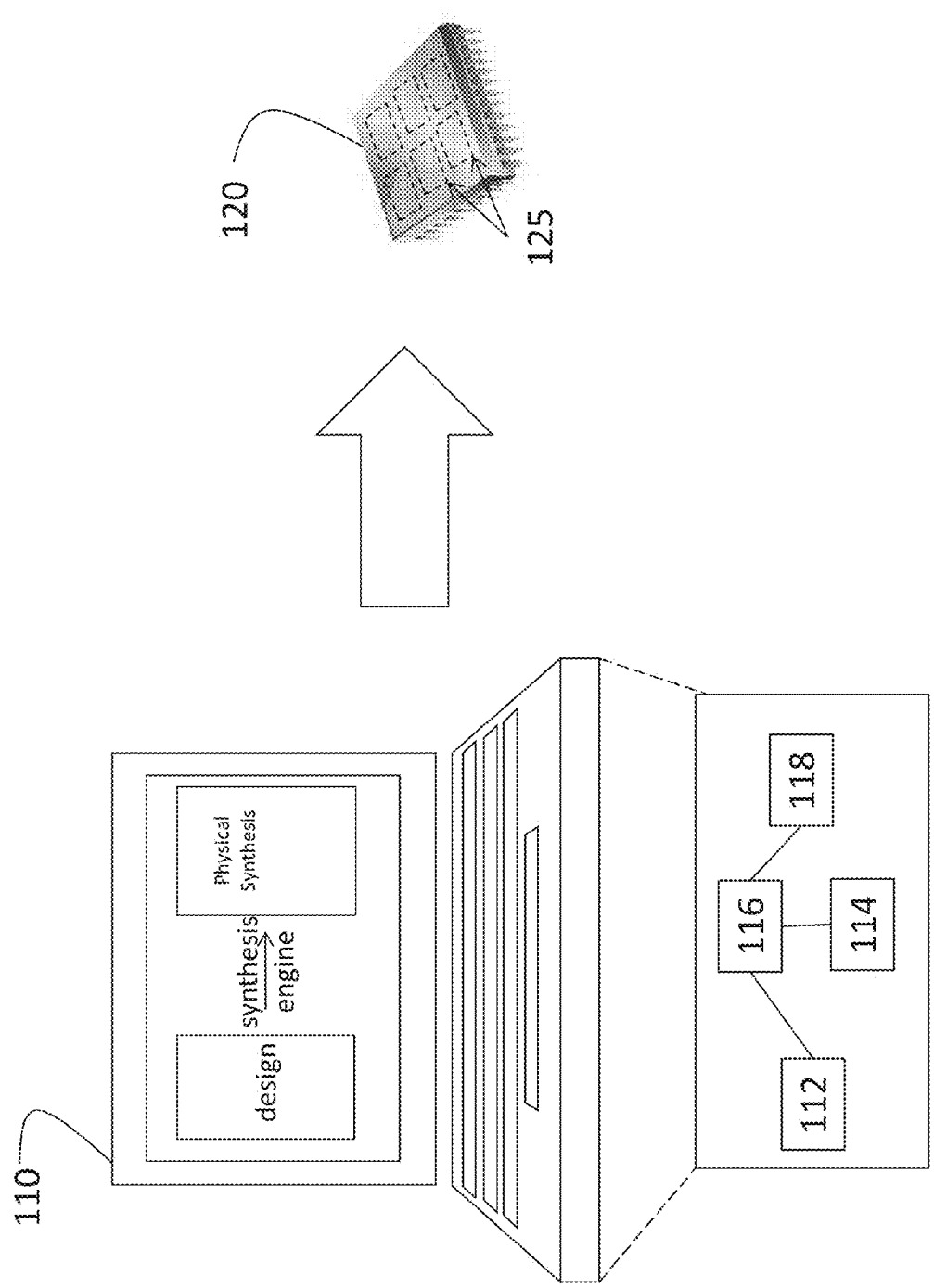
FIG. 1 is a diagram of a physical synthesis system configured to straighten critical paths in a physical synthesis process according to a non-limiting embodiment.

Conventional timing closure tools and systems to date do not achieve first-pass timing closure. Several iterations of logical and physical optimization interleaved with manual efforts are typically required to gradually (and slowly) converge to a fully timing closed solution. These numerous iterations of physical synthesis optimization are one of the most significant problems in modern IC design and layout flows. This is referred to as a "TAT" (Turn-Around-Time) issue. There are numerous causes for failure of first-pass timing closure, but one of the biggest causes is the loose integration of (crude) timing models with optimization. There is a long debate regarding whether most timing-driven optimization algorithms should be labeled as timing-influenced rather than timing-driven techniques. This argument is particularly true in timing-driven placement research. Due to the complexity of computation, most of so-called timing-driven placements deploy a crude timing model. The notion of net weighting is a good example. It prioritizes nets based on timing criticality and then a placement algorithm minimizes the weighted sum of total wire length of all nets. Despite its simplicity, net-weight based timing driven placement is still one of the most popular global placement methods deployed in modern timing closure flows.

Meanwhile, there has been a great deal of focus on incremental timing-driven placement techniques with a higher degree of timing accuracy. The favored approach is to formulate the placement problem via linear programming (LP) with timing constraints embedded. Due to the scalability of linear programming formulation, however, incremental placement (as opposed to global placement) is formulated as a linear programming problem. Moreover, LP is flexible to have different objective functions (worst slack or total negative slack or the combination of them) with different timing models. In at least one embodiment, slack is timing value associated with a connection which indicates the difference between a required time and an arrival time.

The arrival time of a signal can be referred to as the time elapsed for a signal to arrive at a certain point. The reference, or time 0.0, is often taken as the arrival time of a clock signal. To calculate the arrival time, delays of all the components in the path are typically calculated. Arrival times, and indeed almost all times in timing analysis, are normally kept as a pair of values—the earliest possible time at which a signal can change, and the latest.

The required time can be referred to as the latest time at which a signal can arrive without making the clock cycle longer than desired. The computation of the required time proceeds as follows: at each primary output, the required times for rise/fall are set according to the specifications provided to the circuit. Next, a backward topological traversal is carried out, processing each gate when the required times at all of its fanouts are known.

A positive slack "s" at a given node implies that the arrival time at that node may be increased by "s", without affecting the overall delay of the circuit. Conversely, negative slack implies that a path is too slow, and the path must be sped up (or the reference signal delayed) if the whole circuit is to work at the desired speed. While LP is effective for finding the ideal locations of gates according to the timing model employed, placement legalization is still required afterward, which often introduces quite significant perturbation to the previous linear programming solution.

In recent years, the incremental approach has been used to integrate placement optimization with various physical optimizations such as gate sizing, Vt assignment, or even buffering. Placement optimization alone on the physically optimized netlist incurs immediate timing degradation due to wire and sink load changes.

In the integrated approach, subsequent physical optimization can quickly recover from the timing degradation due to placement changes by adjusting the size of gates, layer optimization, Vt types, and buffer insertion or removal.

Various non-limiting embodiments recited herein provide a system which effectively improves the timing of critical paths. For instance, the WS (worst slack) can be improved by about 5%-6%, for example, of the target clock period and the TNS (total negative slack) improved by about 90% to about 92% over those of input netlist. The system performs various optimization operations including:

1. Effectively straightens crooked critical paths by Bézier curve smoothing so as to reduce time closure;
2. Identifying a set of critical common gates (i.e., anchor gates) on multiple paths to perform subsequent critical path segment optimization;
3. Integrating optimization of placement with other physical synthesis techniques including, but not limited to, gate sizing adjustment, layer optimization, Vt types, and buffer assignments such as buffer insertion or removal;
4. Determining available free-space capable of supporting gates identified for placement relocation without requiring complete reset of the current design;
5. Ensuring "What You See Is What You Get" (i.e., "WYSIWYG") property is guaranteed by performing an explicit timing analysis; and
6. Providing multiple gate optimization on the same critical path while guaranteeing a "WYSIWYG" property.

With reference now to FIG. 1, a physical synthesis system 100 configured to synthesize a physical design such as a semiconductor chip, for example, is illustrated according to a non-limiting embodiment. The physical synthesis system 100 includes a processing system 110 (e.g., computer) that implements one or more computer processors such as, for example, an electronic hardware synthesis controller 116 that controls one or more synthesis modules or engine. An input interface 112 (e.g., keyboard, mouse) may be used to develop the logic design which is stored in one or more memory devices 114 of the processing system 110. An output interface 118 (e.g., display, output port) displays a graphical layout or design resulting from the synthesis and/or provides information to place and route components of the physical implementation 120 (e.g., chip). The information includes, but is not limited to, the latch placement location, gate placement location, critical paths, critical gates on the critical path, anchor points, component locations with respect to one or more critical paths, and potential free-space locations, highlighted or emphasized ideal free-space location(s) with respect to a critical path(s) and existing components, and slack benefit values with respect to given free-space.

A slack benefit is a value indicating an improvement or degradation in slack timing provided by relocating a gate to a free-space. For instance, a critical path can include at least one gate coupled thereto that defines an initial slack timing value. Relocating the gate to a free-space may either improve the slack timing or degrade the slack timing. Thus, the slack benefit is essentially the amount of time (e.g., +/− picoseconds) by which the slack time is modified with respect to the initial slack timing.

The physical implementation 120 includes creating components (e.g., transistors, resistors, capacitors) and interconnections therebetween on a semiconductor (e.g., silicon wafer). The physical layout of circuit sub-blocks 125 affects the length of a connecting wire between components and, thus, the timing of signals between them, for example.

Figure 2:
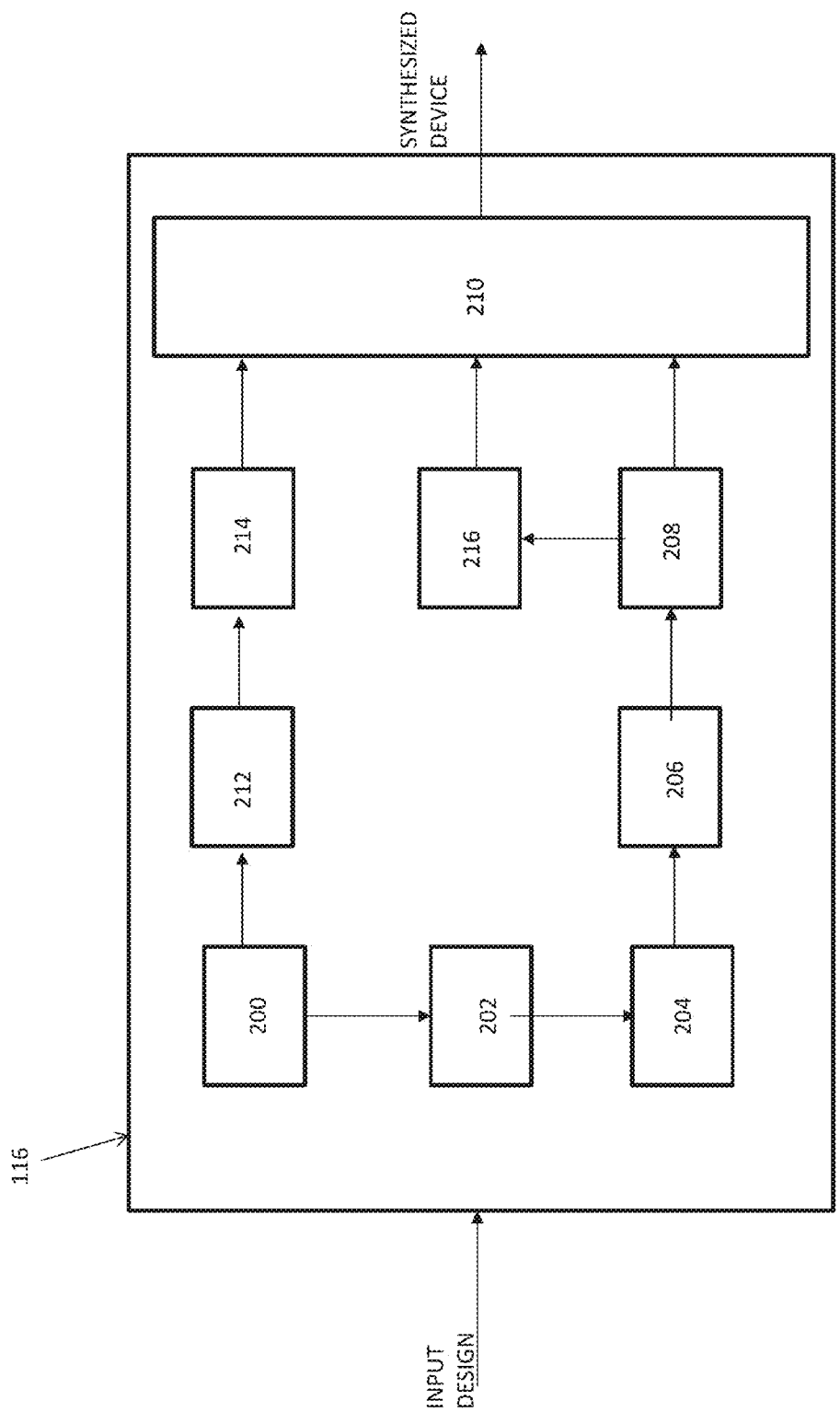
FIG. 2 is a block diagram of a physical synthesis controller included in the physical synthesis system illustrated in FIG. 1 according to a non-limiting embodiment.

The synthesis controller 116 can include one or more individual sub-modules or sub-controllers that execute a respective physical synthesis operation. In at least one non-limiting embodiment illustrated in FIG. 2, the synthesis controller 116 includes a circuit timing module 200, a path straightening module 202, ideal critical point identification (ID) module 204, a free-space ID module 206, a free-space selector module 208, a gate modification module 210, an anchor module 212, a path segment module 214, and a gate sizing module 216. Although FIG. 2 illustrate separate individual modules 200-216, it should be appreciated that one or more of the modules 200-216 can be implemented together into a common or single module. In addition, each module 200-216 can be constructed as an individual hardware controller that executes algorithms, control logic, etc., stored in a respective memory unit to execute the respective synthesis operations of the given module. For instance, the circuit timing module 200 includes a memory unit that stores one or more timing algorithms, while the path straightening module 202 includes a memory unit that stores one or more curve-smoothening algorithms that allow the path straightening module 202 to generate a reference curve based on the dimensions of the critical path.

The circuit timing module 200 generates measurements that represent the timing of a given circuit included in the design. The measurements output by the circuit timing module 200 include a worst slack (WS) value and a total negative slack (TNS) value. In at least one embodiment, the circuit timing module 200 performs a static timing analysis by modeling the given circuit as a timing graph G=(V,E), where each vertex v∈V corresponds to a gate, and each edge e(u, v)∈E represents the connection between a pair of gates u;v∈V. Each vertex v is associated with timing slack SLK (v), which is given by:

$$SLK(v) = RAT(v) - AT(v), \quad (1)$$

where RAT(v) and AT(v) are the required time and the arrival time at the vertex (v).

The timing of a circuit can be represented by the worst slack WS, which is the most critical path timing of a design. Given a slack threshold of $SLK_{th}$, that is the target slack that a design is intended to meet, WS(G) is defined as:

$$WS(G) = \min_{v \in V}(\min(SLK(v), SLK_{th})). \quad (2)$$

The overall timing of the input design can be represented by the total negative slack TNS according to the following equation:

$$TNS(G) = \sum_{v \in V} \min(SLK(v) - SLK_{th}, 0). \quad (3)$$

The TNS is the sum of the differences between $SLK_{th}$ and the slack of a gate (v) (SLK(v)) that is only smaller than $SLK_{th}$. The $SLK_{th}$ is normally set to 0. However, it is not uncommon to set a positive $SLK_{th}$ value due to increasing processing variations.

Accordingly, the circuit timing module 200 can determine each gate in the circuit that has a negative a slack value. This negative slack value can be utilized as a reference slack value, i.e., an initial slack timing value. This reference slack value can be compared to an adjusted slack value that results when relocating a given gate to an available free-space. The comparison provides a slack comparison which allows the physical synthesis system 100 to determine whether to bind the gate to the relocated free-space in order to realize the slack benefit and improve the overall timing closure.

The path straightening module 202 straightens, i.e., smoothens, deviated or meandering critical paths in a targeted manner which avoids introducing new problems and churn at a very late stage of the design process. In at least one embodiment, a critical path is identified a meandering or deviating from its originally intended path by defining a bounding box encompassing a driver and all the sinks. If a length of a critical path is much larger than an encompassing bounding box, the critical path is considered to be meandering or deviating. It is preferred that each critical path should be placed in a straight line, while the gates on the path are distributed evenly along the path. The path straightening module 202 includes a computer hardware process that identifies at least one meandering critical path of a circuit and generates a reference curve based on the dimensions of the critical path.

In one embodiment, the straightening module 202 applies a Bézier curve smoothing process to a deviated or meandering critical path. When performing the Bézier curve smoothing process, the straightening module 202 applies a Bézier curve to smoothen the meandering critical path. The Bézier curve is a parametric curve defined by a set of control points and is configured to model smooth curves. Given a set of n+1 control points, p0 through pn, the corresponding Bézier curve B(t) is defined as:

$$\mathcal{B}(t) = \sum_{i=0}^{n} p_i b_{i,n}(t), \quad 0 \le t \le 1 \quad (4)$$

where bi;n(t) is the Bernstein polynomial of degree n.

Figure 3:
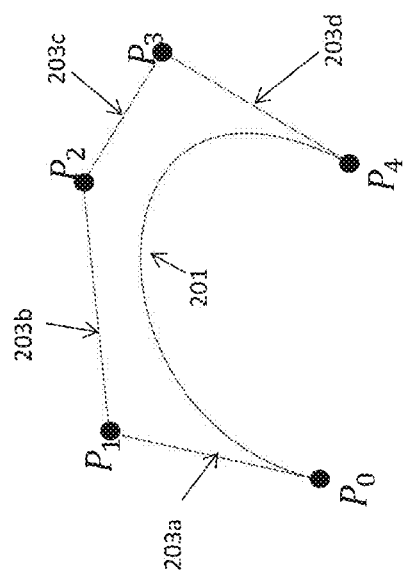
FIG. 3 is a diagram of a Bézier curve employed by the physical synthesis system according to a non-limiting embodiment.

An example of a Bézier curve 201 employed by the straightening module 202 is shown in FIG. 3(a) The Bézier curve 201 begins at the first control point p0 and arrives at the last control point p4. These two control points p0 and p4 serve as the end points of the Bézier curve 201. The remaining intermediate control points act as guidance for the direction the Bézier curve 201 heads toward. In this manner, the generated Bézier curve 201 represents the ideal path for placing the gates g0-g5.

The Bézier curve 201 is completely contained within the convex hull of its control points p0-p4. In addition, the Bézier curve 201 has a variation diminishing property, meaning that the Bézier curve 201 is smoother than the polylines (e.g., 203a-203d) formed by the control points p0-p4. These two properties guarantee that the length of Bézier curve 201 is always shorter than the sum of the control length of the polylines 203a-203d. Therefore, it is extremely effective in smoothing crooked or meandering critical paths.

Figure 4:
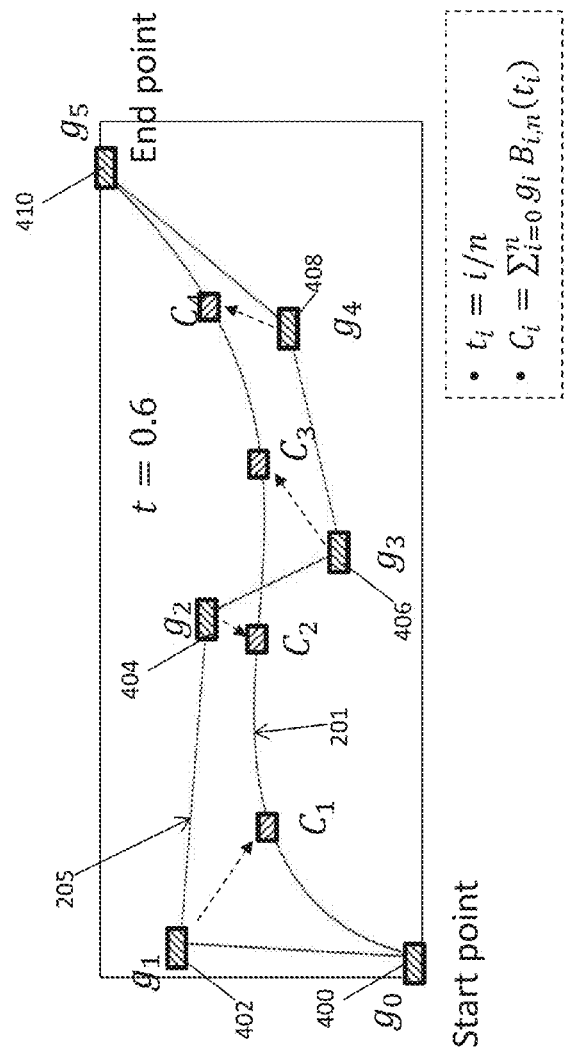
FIG. 4 illustrates applying a Bézier curve to an identified meandering critical path according to a non-limiting embodiment.

An example of the smoothening process performed by the curve straightening module 202 is shown in FIG. 4, where the gate locations 400-410 (g0 . . . g5) on a timing violating path 205, also referred to the actual critical path 205, are illustrated with respect to ideal critical points (e.g. C1-C4) on the Bézier curve 201. The goals of critical path smoothing are: (1) minimize the wire lengths on a critical path, and (2) evenly distribute the gates along the path. It is preferred to place the gates 400-410 (g0-g5) at the ideal critical points (C1-C4) to obtain the highest slack value. For instance, a slack value (−0.8) indicates a more ideal gate location than a slack value of (−10.0).

The ideal critical point ID module 204 evenly samples the curve 201 to determine ideal critical target points (e.g., C1-C4) that corresponding gates 402-408 (e.g., g1-g4) should be relocated toward. As shown in FIG. 4, for example, the ideal critical point ID module 204 can sample the curve 201 and determine that the ideal critical point C2 on the ideal curve 201 corresponds to the ideal location for gate g2. The ideal critical point C2 can be obtained by setting "t" in equation (4) to 0.4. The ideal locations for the remaining gates g1, g3, and g4 can be determined in a similar manner. In at least one embodiment each path of the curve 201 does not require computation—only the sampled points (e.g., C1-C4) need to be computed.

Figure 5:
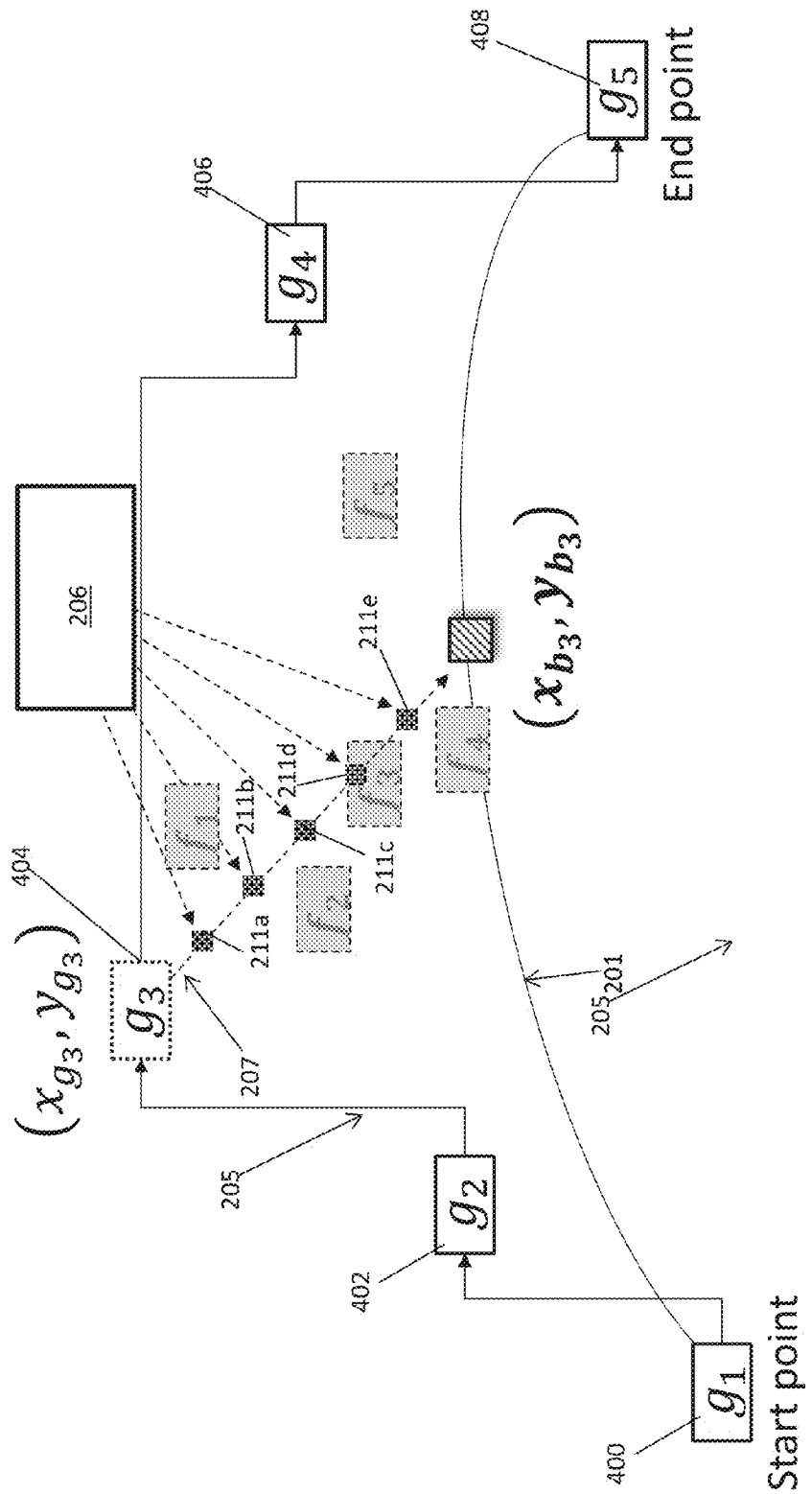
FIG. 5 illustrates several available free-space locations with respect to an ideal critical point located on the Bézier curve according to a non-limiting embodiment.

Referring to FIG. 5, the free-space ID module 206 receives the ideal curve 201 and one or more ideal critical points 209 from the ideal critical point ID module, and generates a reference direction vector 207 between the given gate 404 (e.g., g3) and the corresponding ideal critical point 209 having coordinates ($x_{b3}$, $y_{b3}$). A plurality of reference points 211a-211b are defined on the reference vector 207. The free-space ID module 206 then identifies a free-space (e.g., f1-f5) with respect to the reference points. A free-space f1-f5 indicates an available space on a chip, for example, which can receive a gate 404 (e.g. g3). The free-spaces can be determined based on whether any components are installed in the proximity of a given reference point 211a-211e.

In an embodiment, a free-space (f) is defined as a tuple of consecutive empty placement sites having a size that is bigger than the width of the gate $v_i$. After the ideal critical point $b_i$ for each gate $v_i$ is identified, a set of the available free-spaces near the ideal critical point $F_b(v)$ is constructed. Several different algorithms can be used to construct $F_b(v)$ for each gate. In at least one non-limiting embodiment, only the free-spaces within the bounding box of $v_i$ (i.e., the current location) and its corresponding ideal critical point $b_1$ for each gate are considered as available. For instance, the available free-spaces of the gate 404 (g3) in FIG. 5 are f1, f2, f3, and f4.

The free-space ID module 206 can also determine one or more free-spaces based on a netlist of a timing optimized circuit and its timing graph G=(V;E) provided by the circuit timing module 200, and a set of free-spaces L={$l_1$, . . . , $l_n$}, where each $l_i \in L$ denotes an empty placement site where a gate can be placed, i.e., legal gate locations. In this manner, that WS(G) and TNS(G) are improved as described in greater detail below.

Figure 6:
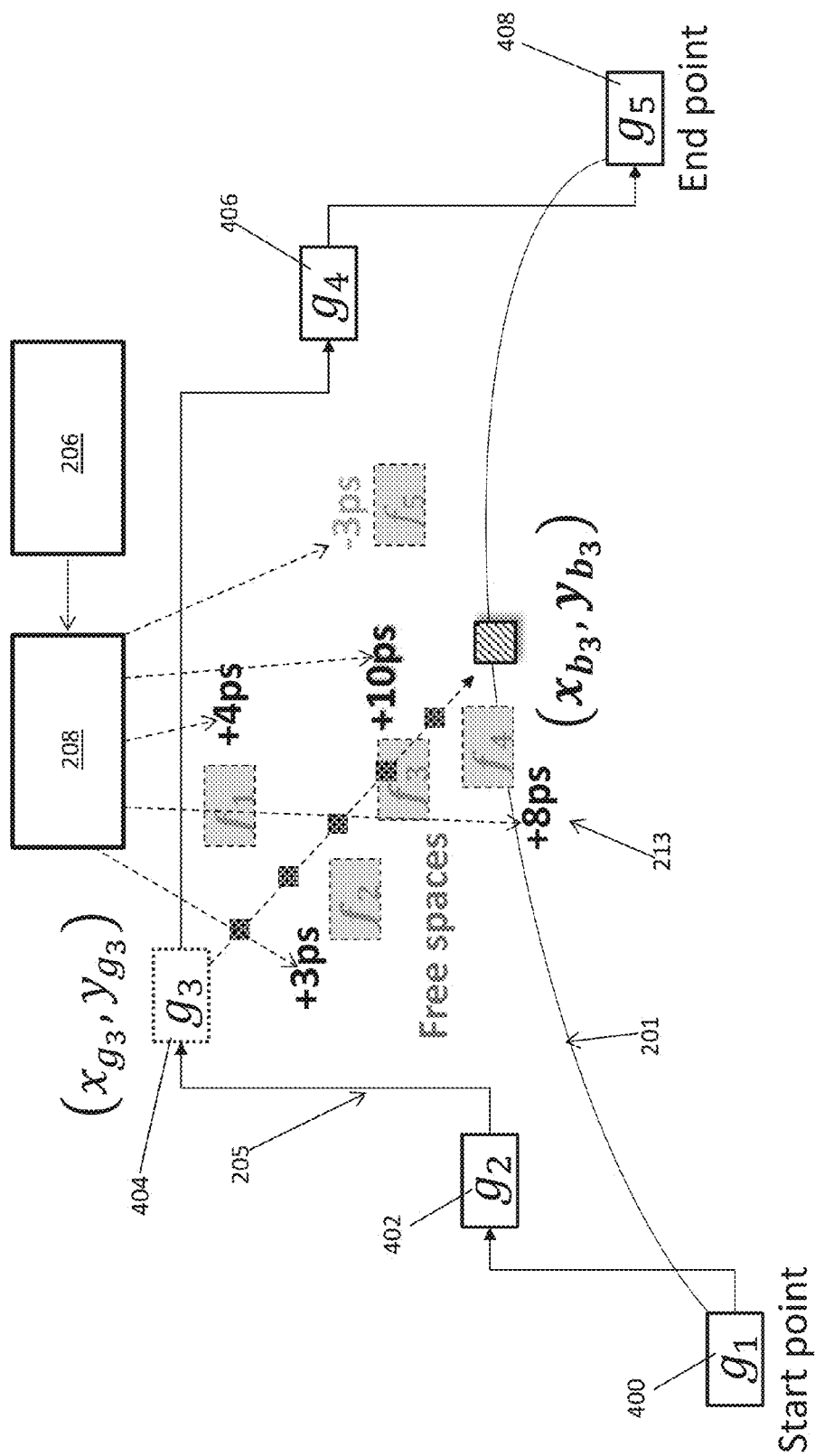
FIG. 6 illustrates slack benefit values corresponding to the free-space locations illustrated in FIG. 5 according to a non-limiting embodiment.

Turning to FIG. 6, the free-space ID module 206 outputs a free-space list signal to the free-space selector module 208, which indicates the available free-spaces (f1-f5). In turn, the free-space selector module 208 selects a free-space among the plurality of available free-spaces based on a slack benefit provided by a given free-space. For example, a slack change that results from locating a gate 404 (e.g., g3) to a given free-space (e.g., f1-f5). Each available free-space f1-f5 of the gate 404 (g3) is annotated with the potential slack benefit value (213). The slack benefit value (213) can be calculated as:

$$\Delta SLK(v_i|f_j) = SLK'(v_i|f_j) - SLK(v_i) \qquad (3)$$

where $SLK'(v_i|f_j)$ is the expected slack of the gate ($v_i$) at the given free-space ($f_j$).

The expected slacks of all the potential free-spaces collected are computed using explicit static timing analysis calls. The free-space selector module 208 can generate a sorted list of gates with their respective available free-spaced list that decreases in order from the maximum slack benefit. In at least one embodiment, only the free-spaces that have a positive potential slack benefit (i.e., timing improvement) are included in the set of potential free-spaces for $v_i$. Free-spaces for a given gate ($v_i$) are denoted by $F'_b(v_j)$.

In the example of FIG. 6, the potential positive free-spaces gate 3 (i.e., $Fb'(v3)$) are {f1, f2, f3, f4}, where f5 provides a negative slack value (e.g., −3 picoseconds) and is therefore excluded from the listing. Given a set of potential free-spaces with positive slack benefits, the maximum slack benefit and the corresponding best free-space of a gate $v_i$ can be defined as:

$$\Delta SLK(v_i) = \max_{f_j \in F'_b(v_i)} \Delta SLK(v_i | f_j), \qquad (6)$$

$$f_{best}(v_i) = \operatorname*{argmax}_{f_j \in F'_b(v_i)} \Delta SLK(v_i | f_j). \qquad (7)$$

In at least one embodiment, the free-space selector module 208 can identify the gate ($v_i$) having the greatest $\Delta SLK$ ($v_i$) among all the gates, and can relocate the identified gate to the free-space location that provides the highest slack value.

Figure 7:
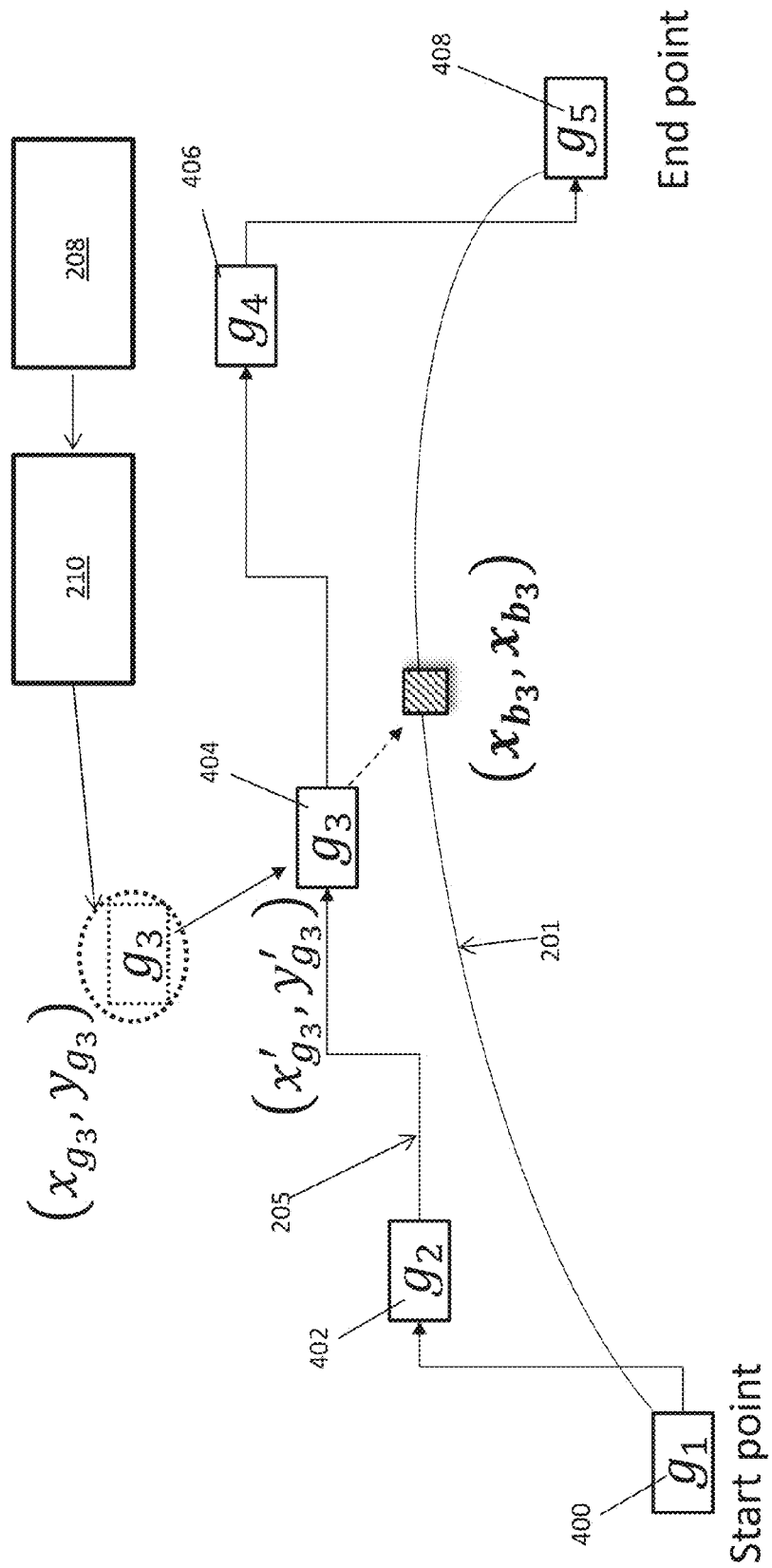
FIG. 7 illustrates a straightened critical path after relocating a selected gate to the free-space location providing the highest slack benefit.

Turning to FIG. 7, the gate modification module 210 relocates the gate 404 (e.g., g3) to the free-space that provides the maximum slack benefit (e.g., f3) as indicated by the free-space selector module 208. For example, the free-space selector module 208 outputs a slack signal indicating that gate 404 (e.g. g3) is identified as having the most positive $\Delta SLK$, and free-space f3 is identified as $f_{best}$ providing the most positive slack value (i.e., 10 ps). Based on the slack signal, the gate modification module 210 relocates the gate 404 (e.g. g3) from its initial location ($x_{g3}$, $y_{g3}$) to free-space f3 ($x'_{g3}$, $y'_{g3}$) as shown in FIG. 7. By moving gate 404 (e.g. g3) to f3, the overall slack of the actual critical path 205 is improved by 10 ps. Since only the set of free-spaces that can accommodate a target gate are considered, subsequent legalization is not required. Moreover, the slack benefit is calculated via an explicit static timing analysis call. Thus, the slack improvement after the optimization is exactly the same slack benefit that is calculated during the construction of $F'_b(v_i)$ for each gate ($v_i$).

The free-space aware timing driven placement described above avoids mismatch between expected timing improvement and realized timing can be avoided. This free-space-aware incremental timing-driven placement operation considers only a set of locations that guarantee a legal placement solution. The expected timing value during the optimization is the exact final timing realized, which is referred to as a "WYSIWYG" property. When a placement technique is free-space aware, it can be applied even at the later stages of the physical synthesis flow because it avoids any unexpected timing degradation. Although a "single-gate-at-a-time" technique is described above, multiple gates can be processed simultaneously without requiring a dependency on the order at which the critical paths are optimized.

Figure 8A:
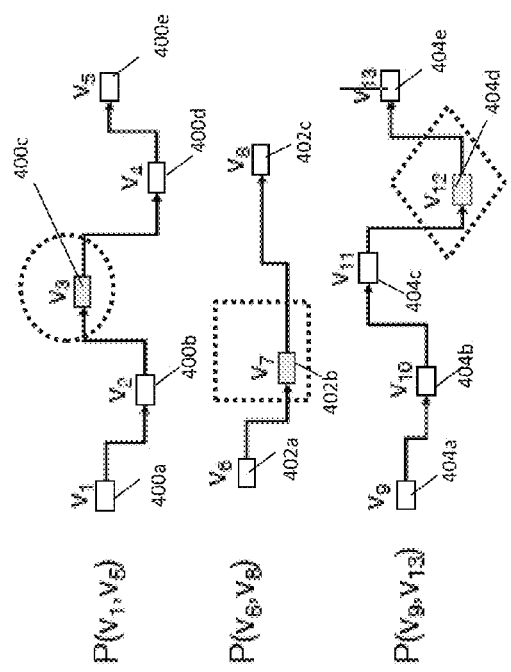
FIG. 8A illustrates several different gates competing for a common free-space location.
Figure 8B:
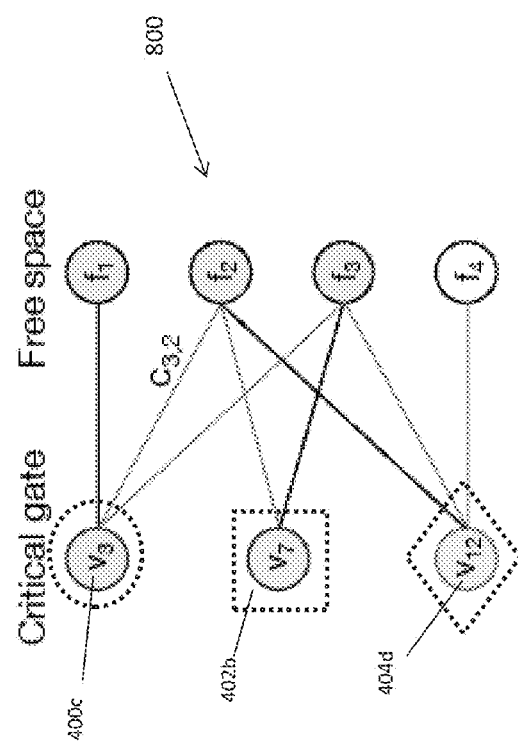
FIG. 8B is a bipartite state algorithm utilized to straighten multiple critical paths without requiring a dependency on the order at which the critical paths are optimized.

Turning to FIGS. 8A-8B, the free-space selector 208 processes multiple gates (400a-400e, 402a-402c, 404a-404e) at a time to eliminate dependency on the order at which the critical paths are optimized based on a bipartite state algorithm 800 (see FIG. 8B). The bipartite graph 800 is defined as B=($V_l$, $F_r$, M), where $V_1$ and $F_r$ are two disjoint vertex sets, i.e., $V_l$ and $F_r$ are each independent sets such that every edge in M, m($v_i$,$f_j$), connects a vertex $v_i \in V_l$ to $f_j \in F_r$. As shown in FIG. 8B, each vertex $v_i$ in $V_1$ (e.g., V3, V7, V12) corresponds to the gate having the greatest $\Delta$SLK for each critical path segment. The vertex $f_r$ (e.g., f1-f4) indicates free-spaces, each of which is a potential free-space of at least one gate in $V_l$. An edge m($V_i$,$F_j$)$\in$M is constructed if $f_j$ is one of the potential free-spaces for the gate $v_i$. Each edge is associated with the cost $c_{i,j}$=$\Delta$SLK($v_i$|$f_j$), which is the slack benefit that results when the gate ($v_i$) is re-placed at a given free-space (f). While multiple gates (e.g., 400c, 402b, 404d) from different critical path segments may compete for a common free-space, the bipartite matching operation performed by the free-space selector 208 guarantees that the overall slack benefits of those critical path segments are maximized.

Figure 9A:
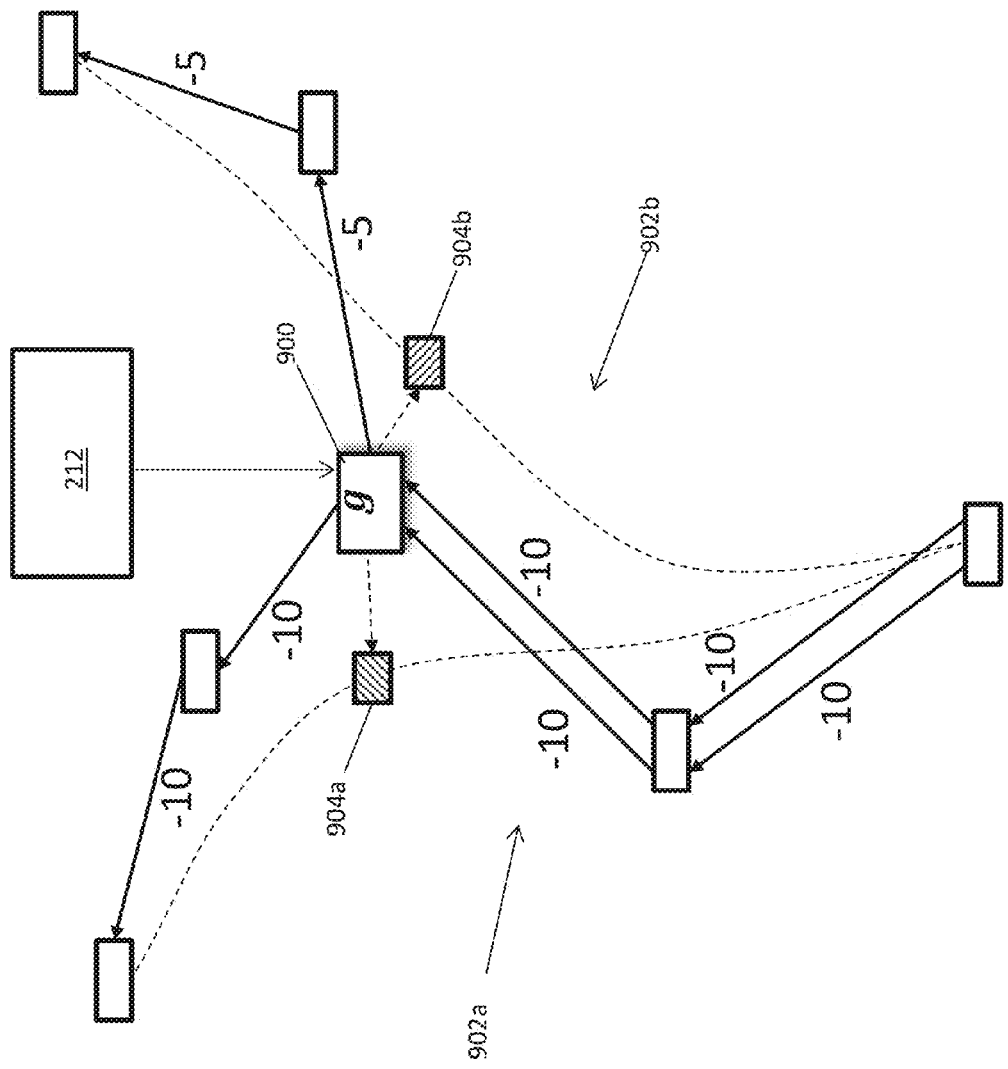
FIG. 9A illustrates two different critical paths coupled to a common anchor gate.
Figure 9B:
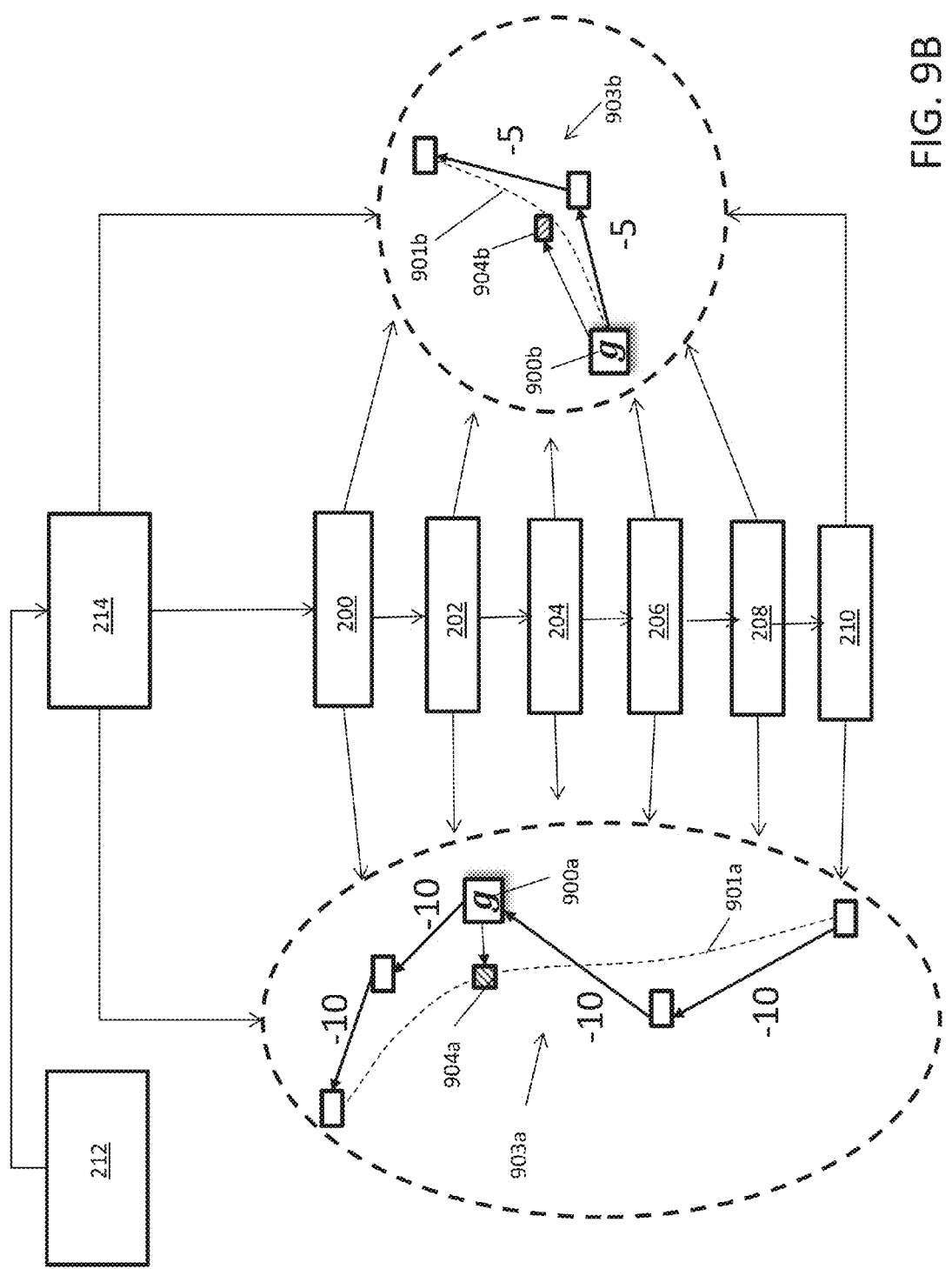
FIG. 9B illustrates two individual path segments having a respective Bézier curve applied thereto after separating the critical paths from the common anchor gate.

With reference now to FIGS. 9A-9B, operations performed by the anchor module 212 and the path segment module 214 are illustrated according to a non-limiting embodiment. In this example, a gate 900 is coupled to different critical paths 902a and 902b. That is, two different critical paths are coupled to a common gate 900, which is referred to as an anchor gate 900.

The anchor module 212 identifies an anchor gate 900 as a gate that has multiple target locations 904a, 904b. For instance, a first ideal target location, i.e., critical point, 904a is associated with the first critical path 902a while a second ideal target location 904b is associated with the second critical path 902b. Two separate Bézier curves 901a-901b (not annotated in FIG. 9A) are applied to the paths while they are coupled to the common gate 900. When a common anchor gate 900 exists, however, the second Bézier curve 901b applied to the second path 902b can result in an inefficient fit.

To improve the fit of the second Bézier curve 901b, the path segment module 214 separates the coupled paths 902a-902b into two separate and individual path segments 903a and 903b. For example, the location of the anchored gate 900 and the corresponding paths 902a and 902b are delivered from the anchor module 212 to the path segment module 214. As illustrated in FIG. 9B, the path segment module separates the original paths into two separate critical path segments 903a and 903b, which are then analyzed separately. Each segment of the first path segment 903a has a common slack time (e.g., −10), while each segment of the second path segment 903b has a different common slack time (e.g., −5). Accordingly, each path segment 903a-903b is a maximal subset of a critical path where every edge slack is the same.

Thereafter, the straightening module 202 generates a first Bézier curve 901a to smoothen the first meandering critical path 902a and a second Bézier curve 901b to smoothen the second meandering critical path 902b. As further illustrated in FIG. 9B, the second Bézier curve 901b is better fit to the second meandering critical path 902b compared to the Bézier curve 901b.

In at least one embodiment, the anchor gate 900 is placed according to a quadratic placement procedure. For example, given a set of path segments (P), the anchor module 212 first identifies the fixed anchor gates and the movable anchor gates. Fixed anchors can be identified, for example, as gates located at either the start or the end of a path segment. The placement of an anchor gate can be determined based on the relationship of G'=(V',E'), where V represents the moveable and fixed anchor gates. An edge is then created between two anchors ($v_i$, $v_j$) if they belong to the same path segment. Each edge (vi, vj) is associated with a weight w($v_i$, $v_j$), which is defined as:

$$w(v_i, v_j) = \frac{|SLK(P(v_i, v_j)) - SLK_{th}|}{|P(v_i, v_j)| + 1}, \quad (8)$$

where P($v_i$, $v_j$) is the path segment from $v_i$ to $v_j$, SLK(P($v_i$,$v_j$)) is the slack of P($v_i$,$v_j$) and |P($v_i$,$v_j$))| denotes the number of non-anchor movable gates in P($v_i$,$v_j$).

The numerator (i.e., |SLK(P($v_i$,$v_j$))−SLK$_{th}$|) represents the impact of the negative slack of the path segment, and the denominator (i.e., (i.e., |P($v_i$,$v_j$)|+1) is the number of wires defining the path segment. The weight w($v_j$,$v_j$) has a higher value if the path is more critical.

Thereafter, the anchor module 212 determines the minimization of weighted quadratic wire lengths on G' based on the following expression:

$$\text{Minimize} \sum_{e(v_i, v_j) \in E} w(v_i, v_j) \times ((x_i - x_j)^2 + (y_i - y_j)^2), \quad (9)$$

where $x_i$ and $y_i$ ($x_j$ and $y_j$) are the x and y coordinates of $v_i$($v_j$), respectively.

The critical point ID module 204 identifies a first critical point 904a on the first curve 901a and a second critical point 904b on the second curve 901b. The free-space ID module 206 and free-space selector module 208 work together to identify and select free-spaces with respect to the critical points 904a-904b as described above. Accordingly, the gate modification module 210 relocates the anchor gate 900 to a target point location that improves the slack timing of both the first path segment 903a and the second path segment 903b.

In some instances, relocating a gate can cause the size of a replaced gate and its neighboring gates to become stale. For example, moving a gate to its ideal location can reduce the wire length between the relocated gate and its driver gate, while slightly increasing the wire length between the relocated gate and its fanout gate. Thus, the load capacitance of the relocated gate can be adversely increased. Similarly, the load capacitance of a relocated gate after critical path smoothing can decrease, while the wire load of its driver increases. In both cases, the sizes of relocated gate and/or the driver need to be adjusted and re-optimized.

In at least one embodiment, the gate sizing module 216 performs a gate sizing optimization after performing the critical path smoothing operations described above. In at least one embodiment, only gate sizes that the current free-space can accommodate are considered as candidate sizing options to avoid incurring additional legalization steps. By performing gate sizing simultaneously with critical path smoothing, further slack improvement (and sometimes area savings) can be achieved.

In at least one embodiment, the slack benefit can further be improved by performing additional gate modification procedures after relocating a gate to a selected free-space.

With reference to FIG. 10, the gate 400a is identified for relocation and the free-space selector module 208 identifies the most ideal free-space (e.g., f2) for relocating the gate 400a.

Turning to FIG. 10B, the gate sizing module 216 receives data from the free-space selector module 208 identifying a particular gate 400a that has been relocated to the free-space (f2) providing the most slack benefit. After relocating gate 400a to an available free-space (f2), the gate sizing module 216 resizes the gate 400b (e.g., increases the gate size or decreases the gate size), thereby adjusting the load applied to the critical path and improving overall timing closure. Although a "single-gate-at-a-time" technique is described herein, multiple gates can be processed simultaneously without departing from the scope of the invention.

In at least one embodiment, the gate sizing module 216 calculates the change in the wire load of a gate (v) and its driver gate (u) when it is moved prior to computing the potential slack benefit. After identifying the gate 400, the gate sizing module 216 can increase the size (e.g. doubles the size) of the gate 400b at the relocated free-space (f2). In at least one embodiment, the gate sizing module 216 determines the adjusted size of the gate 400b and its driver gate based on the following operations:

(a) determine a load threshold value ($L_{TH}$);
(b) determine the initial wire length of the output net of the relocated gate (v);
(c) determine the initial wire length of the output net of the v's driver gate (u);
(d) calculate the wire length increases of the output nets of the driver gate (u) ($\Delta WL_u$) and the relocated gate (v) ($\Delta WL_v$);
(e) resize the driver gate (u) when $\Delta WL_u$ exceeds $L_{TH}$;
(e) resize the relocated gate (v) when $\Delta WL_v$ exceeds $L_{TH}$;

After performing the resizing operation, the potential slack benefit $\Delta SLK(vi|fj)$ is computed using the newly selected sizing candidates of the gates (v) and/or the driver (u). After free-space assignment, associated sizing candidates for each allocated free-space can be analyzed by the gate sizing module 216. If the current size of a gate is different from the associated sizing candidate, the gate modification module 210 binds the new gate size after movement to the newly assigned free-space using, for example, the bipartite matching algorithm described herein. If adjusted sizing provides no timing improvement, the gate size can be reverted back to its initial gate size and then moved to the free-space at its initial size.

Although a gate sizing process is described, various other gate modifications process can be performed to further improve the slack benefit thereby improving overall timing closure. For example, the physical synthesis system may include a layer adjustment module (not shown) that relocates the wire of the output net of a relocated gate to a different metal layer of the chip in order to adjust the load capacitance realized by the relocated gate. In addition, Vt assignments buffer assignments, and/or layer adjustment module can perform simultaneous layer assignments of each net connected to a relocated gate such that overall timing closure is further improved. Each of these additional assignments can be performed by an individual controller or can be controlled by a single module such as, for example, the modification module 210.

Figure 11:
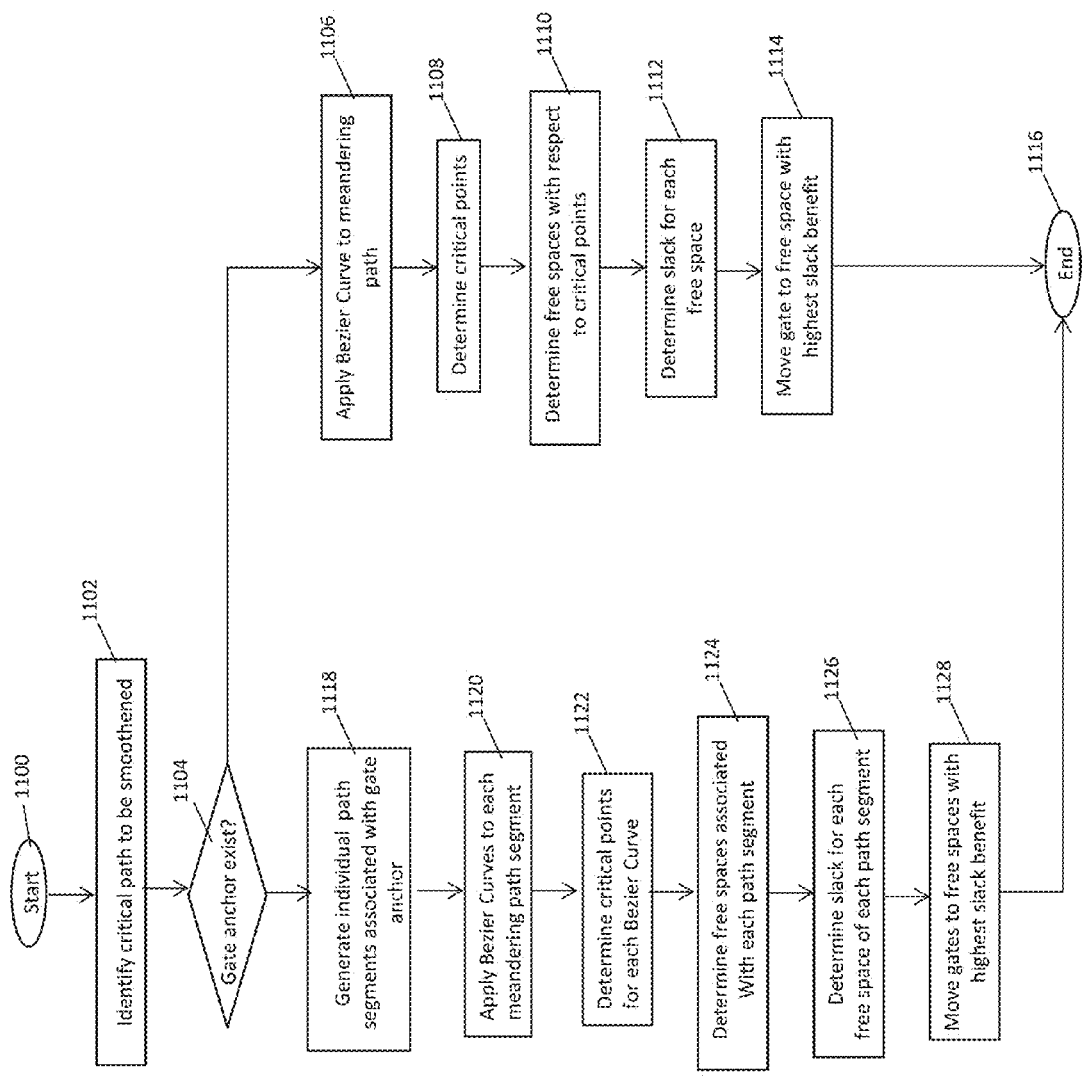
FIG. 11 is a method of straightening a critical path according to a non-limiting embodiment.

Turning now to FIG. 11, a flow diagram illustrates a method of straightening a critical path according to a non-limiting embodiment. The method begins at operation 1100, and at operation 1102 a meandering (i.e., diverging) critical path for 1102 is identified to be smoothened. At operation 1104, a determination is made as to whether the identified meandering critical path includes an anchor gate. When no anchor gates exist, the method proceeds to operation 1106 and a Bézier curve is applied to the meandering path. At operation 1108, one or more ideal critical points on the Bézier curve are determined. At operation 1110, one or more free-spaces associated with a respective critical point are determined. At operation 1112, the slack benefit is determined for each identified free-space. At operation 1114, the candidate gate is relocated to the free-space providing the highest slack benefit, and the method ends at operation 1116. Although the flow diagram shows the operations ending after moving the gate to the selected free-space, it should be appreciated that the method can return back to operation 1102 after moving the selected gate to identify any additional critical paths for smoothening. If another meandering critical path is identified, the method is repeated as described above. Accordingly, one or more identified meandering critical paths can be smoothened to improve the overall timing closure without the need to reset the entire design.

When, however, an anchor gate is identified at operation 1104, the meandering critical path is separated into individual path segments at operation 1118. At operation 1120, individual Bézier curves are applied to each path segment. At operation 1122, critical points for each Bézier curve are determined. At operation 1124, the available free-spaces with respect the ideal critical points of each Bézier curve are determined. At operation 1126, slack benefit for each free-space associated with each path segment is determined. At operation 1128, the gates are relocated associated with each path segment are relocated to the free-spaced that provides the highest slack benefit, and the method ends at operation 1116.

In at least one embodiment, a multiple-gate-at-a-time optimization process may be performed. Although multiple path segments are optimized simultaneously, note that the OWARU algorithm described thus far only replaces a single gate per path segment per iteration. To more efficiently improve the timing of a circuit, we extend OWARU to optimize multiple gates per segment at each iteration. First, each path segment is assigned a unique index in the ascending order of its timing slack. In addition, each gate v in the $i_{th}$, path segment is now assigned two indices i and j, and denoted by $v_i;_j$; the second index j is obtained by numbering vertices in the path segment sequentially from the start point as shown in FIG. 12 (a). Three path segments are given in the example where the path segment with the worst slack P1(v1;v5) is assigned the smallest index.

The formulation of the bipartite graph B=(Vl;Fr;M) can be extended with all the gates in a path segment. The set of left vertices Vl now contains every gate vi; j which has at least one available free space $f_k$ such that $\Delta SLK(v_i; j_j f_k)$ is larger than zero. Such gates are represented by the shaded boxes in FIG. 12 (a), and the vertices in the left partition of the bipartite graph shown in FIG. 12 (b). Correspondingly, all the available free spaces are included in the right partition Fr, and edges can be created between the gate and the free spaces as described herein. The cost of an edge between gate $v_{i;j}$ and free space $f_k$ is now denoted as $c_{k\ i;\ j}$, which is set to $\Delta SLK\ (v_{i,j}|f_k)$.

The free space assignment problem for multiple gates can now be formulated as an integer liner programming (ILP) solution represented as:

$$\text{Maximize} \sum_{v_{i,j} \in V_l} \sum_{f_k \in F_r} c^k_{i,j} x^k_{i,j}, \tag{10}$$

-continued $$\text{Subject to } x_{i,j}^k \in \{0, 1\}, v_{i,j} \in V_l, f_k \in F_r \quad (11)$$

$$\sum_{v_{i,j} \in V} x_{i,j}^k \leq 1, \forall f_k \in F_r \quad (12)$$

$$\sum_{f_k \in F_r} x_{i,j}^k + \sum_{f_k \in F_r} x_{i,j-1}^k \leq 1, \forall v_{i,j} \in |V_l \quad (13)$$

$$\sum_{f_k \in F_r} x_{i,j}^k + \sum_{f_k \in F_r} x_{i,j+1}^k \leq 1. \forall v_{i,j} \in V_l \quad (14)$$

Equations (10) through (12) formulate the maximum cost bipartite matching problem for gates. The potential slack benefit of a gate is computed with the assumption that its neighboring gates are fixed. To preserve this property, the constraints of equation (13) and equation (14) ensure that the matching result does not include the consecutive movements of neighboring gates.

Instead of directly solving the time-consuming ILP problem, a post-processing heuristic can be performed in which the maximum cost bipartite matching is solved on "B", and then the matching results violating the constraints of equation (13) and/or equation (14) are filtered out. The matching results between gates and free spaces are sorted in descending order of the cost of the edge (i.e., the maximal slack benefit), and then in ascending order of the indices of the path segments. The free space assignment results are committed from top to bottom, in decreasing order of slack benefits. If two consecutive gates are committed (i.e., the violation of the constraints of equation (13) and/or equation (14) in ILP), the second move is rejected. Accordingly, multiple gates can be optimized at a time. In at least one embodiment, the heuristic allows for repositioning of only up to half of the gates a per path segment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A physical synthesis system, comprising:
a path straightening module including a computer hardware processor that identifies at least one meandering critical path of a circuit, and generates a reference curve based on dimensions of the critical path, wherein the critical path includes at least one gate coupled thereto that defines an initial slack timing value;
an ideal critical point identification (ID) module including a hardware computer processor that identifies at least one critical point on the reference curve;
a free-space ID module including a hardware computer processor that identifies at least one free-space to receive the gate with respect to the at least one critical point, wherein the at least one free-space indicates an available space on the circuit;
a free-space selector module including a hardware computer processor that determines a modified slack timing value based on relocating the at least one gate to the at least one free-space;
a gate modification module including a hardware computer processor that moves the at least one gate to the at least one free-space when the modified slack timing value is greater than the initial slack timing value, wherein the free-space ID module identifies a plurality of free-spaces to receive the gate, and wherein the free-space selector module determines a slack timing benefit of each free-space among the plurality of free-spaces; and
a output interface that outputs a physical implementation of the circuit and causes the circuit to be fabricated.

2. The physical synthesis system of claim 1, wherein the gate modification module relocates the gate to a free-space having the highest slack timing benefit among the plurality of free-spaces.

3. The physical synthesis of claim 2, wherein the slack timing benefit is based on a difference between a given modified slack timing value and the initial slack timing value.

4. The physical synthesis of claim 2, further comprising:
an anchor module including a hardware computer processor that identifies an anchor gate coupled to a first critical path and a second critical path different from the first critical path; and
a path segment module that separates the first and second critical paths into a first individual path segment having a first common edge slack, and a second individual path segment having a second common edge slack that is different from the first common edge slack.

5. The physical synthesis of claim 4, wherein:
the path straightening module generates a first reference curve based on dimensions of the first path segment, the anchor gate defining a first initial slack timing value associated with the first path segment;
the ideal critical point identification (ID) module including a hardware computer processor that identifies at least one critical point on the first reference curve;
the free-space ID module including a hardware computer processor that identifies at least one first segment free-space to receive the anchor gate with respect to the at least one critical point on the first reference curve;
the free-space selector module including a hardware computer processor that determines a modified slack timing value based on relocating the anchor gate to the at least one first segment free-space; and
wherein:
the path straightening module generates a second reference curve based on dimensions of the second path segment, the anchor gate defining a second initial slack timing value associated with the second path segment;
the critical point identification (ID) module including a hardware computer processor that identifies at least one critical point on the second reference curve;
the free-space ID module including a hardware computer processor that identifies at least one second segment free-space to receive the anchor gate with respect to the at least one critical point on the second reference curve; and
the free-space selector module including a hardware computer processor that determines a modified slack timing value based on relocating the anchor gate to the at least one second segment free-space.

6. The physical synthesis of claim 2, further comprising a gate sizing module that determines a load capacitance applied to the relocated gate, and resizes the relocated gate based on a load capacitance.

7. A method of straightening a critical path, the method comprising:
identifying, via a path straightening module including a computer hardware processor, at least one meandering critical path of a circuit, and generating via the path straightening module a reference curve based on dimensions of the critical path, wherein the critical path includes at least one gate coupled thereto that defines an initial slack timing value;

identifying, via a critical point identification (ID) module including a hardware computer processor, at least one critical point on the reference curve;

identifying, via a free-space ID module including a hardware computer processor, at least one free-space to receive the gate with respect to the at least one critical point, wherein the at least one free-space indicates an available space on the circuit;

determining, via a free-space selector module including a hardware computer processor, a modified slack timing value based on relocating the at least one gate to the at least one free-space; and moving, via a gate modification module including a hardware computer processor, the at least one gate to the at least one free-space when the modified slack timing value is greater than the initial slack timing value;

identifying, via the free-space ID module, a plurality of free-spaces to receive the gate, wherein the free-space selector module determines a slack timing benefit of each free-space among the plurality of free-spaces; and causing the fabrication of the circuit by outputting a physical implementation of the circuit.

8. The method of claim 7, further comprising relocating, via the gate modification module, the gate to a free-space having the highest slack timing benefit among the plurality of free-spaces.

9. The method of claim 8, wherein the slack timing benefit is based on a difference between a given modified slack timing value and the initial slack timing value.

10. The method of claim 8, further comprising:
identifying, via an anchor module including a hardware computer processor, an anchor gate coupled to a first critical path and a second critical path different from the first critical path; and separating, via a path segment module including an electronic hardware computer processor, the first and second critical paths into a first individual path segment having a first common edge slack, and a second individual path segment having a second common edge slack that is different from the first common edge slack.

11. The method of claim 10, wherein:
generating, via the path straightening module, a first reference curve based on dimensions of the first path segment, the anchor gate defining a first initial slack timing value associated with the first path segment;

identifying, via the critical point ID module, at least one critical point on the first reference curve;

identifying, via the free-space ID module, at least one first segment free-space to receive the anchor gate with respect to the at least one critical point on the first reference curve;

determining, via the free-space selector module, a modified slack timing value based on relocating the anchor gate to the at least one first segment free-space;

generating, via the path straightening module, a second reference curve based on dimensions of the second path segment, the anchor gate defining a second initial slack timing value associated with the second path segment;

identifying, via the critical point ID module, at least one critical point on the second reference curve;

identifying, via the free-space ID module, at least one second segment free-space to receive the anchor gate with respect to the at least one critical point on the second reference curve; and determining, via the free-space selector module, a modified slack timing value based on relocating the anchor gate to the at least one second segment free-space.

12. The method of claim 8, further comprising determining, via a gate sizing module including an electronic hardware processor, a load capacitance applied to the relocated gate, and resizes the relocated gate based on a load capacitance.

13. A computer program product for straightening a critical path of an electronic circuit, the computer program product comprising a computer readable storage medium having program instructions embodied therewith, the program instructions executable by an electronic computer processor to perform:

identifying at least one meandering critical path of a circuit, and generating a reference curve based on dimensions of the critical path, wherein the critical path includes at least one gate coupled thereto that defines an initial slack timing value;

identifying at least one critical point on the reference curve;

identifying at least one free-space to receive the gate with respect to the at least one critical point, wherein the at least one free-space indicates an available space on the circuit;

determining a modified slack timing value based on relocating the at least one gate to the at least one free-space; and moving the at least one gate to the at least one free-space when the modified slack timing value is greater than the initial slack timing value;

identifying a plurality of free-spaces to receive the gate, and determining, via a free-space selector module, a slack timing benefit of each free-space among the plurality of free-spaces; and causing the fabrication of the electronic circuit by outputting a physical implementation of the circuit.

14. The computer program product of claim 13, further comprising relocating the gate to a free-space having the highest slack timing benefit among the plurality of free-spaces.

15. The computer program product of claim 14, wherein the slack timing benefit is based on a difference between a given modified slack timing value and the initial slack timing value.

16. The computer program product of claim 14, further comprising:
Identifying an anchor gate coupled to a first critical path and a second critical path different from the first critical path; and separating the first and second critical paths into a first individual path segment having a first common edge slack, and a second individual path segment having a second common edge slack that is different from the first common edge slack.

17. The computer program product of claim 16, wherein:
generating a first reference curve based on dimensions of the first path segment, the anchor gate defining a first initial slack timing value associated with the first path segment;

identifying at least one critical point on the first reference curve;

identifying at least one first segment free-space to receive the anchor gate with respect to the at least one critical point on the first reference curve;

determining a modified slack timing value based on relocating the anchor gate to the at least one first segment free-space;

generating a second reference curve based on dimensions of the second path segment, the anchor gate defining a second initial slack timing value associated with the second path segment;

identifying at least one critical point on the second reference curve;

identifying at least one second segment free-space to receive the anchor gate with respect to the at least one critical point on the second reference curve;

determining a modified slack timing value based on relocating the anchor gate to the at least one second segment free-space; and determining a load capacitance applied to the relocated gate, and resizes the relocated gate based on a load capacitance.

* * * * *